United States Patent [19]
Miura

[11] Patent Number: 5,809,301
[45] Date of Patent: Sep. 15, 1998

[54] NETWORKED INFORMATION PROCESSING SYSTEM HAVING A PROCESS DEFINING APPARATUS FOR TRANSFERRING DEFINED PROCESS INFORMATION TO A PROCESSING APPARATUS AND FOR ADDING AN IDENTIFIER

[75] Inventor: Yuji Miura, Samukawa-machi, Japan

[73] Assignee: Ricoh Company, Ltd., Tokyo, Japan

[21] Appl. No.: 441,736

[22] Filed: May 16, 1995

[30] Foreign Application Priority Data

May 16, 1994 [JP] Japan ................................. 6-125792

[51] Int. Cl.⁶ ...................................................... G06F 9/40
[52] U.S. Cl. .......................................................... 395/680
[58] Field of Search ........................... 395/200, 200.03, 395/675, 674, 672, 680; 358/296, 400, 442

[56] References Cited

U.S. PATENT DOCUMENTS

| | | | |
|---|---|---|---|
| 4,937,762 | 6/1990 | Todome | 345/439 |
| 4,947,345 | 8/1990 | Paradise et al. | 358/442 |
| 5,267,047 | 11/1993 | Argenta et al. | 358/400 |
| 5,287,194 | 2/1994 | Lobiondo | 358/296 |
| 5,333,246 | 7/1994 | Nagasaka | 345/433 |
| 5,422,729 | 6/1995 | Yoshida | 358/400 |
| 5,459,579 | 10/1995 | Hu et al. | 358/296 |
| 5,511,156 | 4/1996 | Nagasaka | 345/433 |
| 5,577,182 | 11/1996 | Hayashi et al. | 395/137 |
| 5,598,533 | 1/1997 | Yokota et al. | 395/200.08 |

OTHER PUBLICATIONS

W. Richard Stevens, Unix Network Programming, 1990, (pp. 115–117 and pp. 527–537).

*Primary Examiner*—Alvin E. Oberley
*Assistant Examiner*—St. John Courtenay, III
*Attorney, Agent, or Firm*—Oblon, Spivak, McClelland, Maier & Neustadt, P.C.

[57] ABSTRACT

An information processing system in which a plurality of information processing apparatuses perform inter-communication with each other. A first information processing apparatus defines information processes and adds identifiers to the information processes. A second information processing apparatus processes the information defined by the first information process in accordance with selected identifiers.

8 Claims, 6 Drawing Sheets

```
1. IMAGE INPUT (BINARY)      TRANSFER      (TANAKA, 16, 16)

2. IMAGE INPUT (BINARY)      FAX           (SATO, 8, FRONT PAGE, 18:30)

3. IMAGE INPUT (MULTI-LEVEL) PRINT         (6, 32, 64, PAGE)

4. IMAGE INPUT (BINARY)      PRINT         (    ), FAX (    )

5. IMAGE INPUT (BINARY)      DISTRIBUTION  (TANAKA, NAKAMURA, SATO, SASAKI, PRINT)

[IMAGE INPUT] [TRANSFER] [FAX] [PRINT] [FILING] [DISTRIBUTION] [END]
```

1. IMAGE INPUT (BINARY)      TRANSFER      (TANAKA, 16, 16)
2. IMAGE INPUT (BINARY)      FAX           (SATO, 8, FRONT PAGE, 18:30)
3. IMAGE INPUT (MULTI-LEVEL) PRINT         (6, 32, 64, PAGE)
4. IMAGE INPUT (BINARY)      PRINT         (      ), FAX (      )
5. IMAGE INPUT (BINARY)      DISTRIBUTION  (TANAKA, NAKAMURA, SATO, SASAKI, PRINT)

[IMAGE INPUT] [TRANSFER] [FAX] [PRINT] [FILING] [DISTRIBUTION] [END]

*FIG. 4*

NETWORKED INFORMATION PROCESSING SYSTEM HAVING A PROCESS DEFINING APPARATUS FOR TRANSFERRING DEFINED PROCESS INFORMATION TO A PROCESSING APPARATUS AND FOR ADDING AN IDENTIFIER

BACKGROUND OF THE INVENTION

1. Field of the Invention

This invention generally relates to a networked information processing system. The invention is more particularly related to a system in which an information processing apparatus has a process defining apparatus with a defined information process function which can be shared with other information processing apparatuses.

2. Discussion of the Background

In recent years, information processing systems have become commonly used in offices in which information processing apparatuses inter-communicate with each other. Such information processing apparatuses are connected to each other via a common transmission path to perform intercommunications or they may use recording media which are detachably attached to each of the information processing apparatuses.

FIG. 1 shows an example of a conventional apparatus as described in Japanese Laid-Open Patent Application No.59-64956. The information processing system shown in FIG. 1 uses the above-mentioned intercommunication method using a common transmission path.

The conventional information processing system shown in FIG. 1 includes a plurality of work stations 41, a print server 42, a file server 43, a facsimile server 44, and a transmission path 49. Each of the stations 41, which may be referred to as clients, is operated by a user using the information processing system. Accordingly, each of the work stations 41 is provided with a display apparatus for interfacing between the user and the system, and an inputting apparatus, such as a keyboard, for inputting instructions to the system. Generally, the display apparatus has a sophisticated user interface so that the user can input instructions for various functions incorporated in the system by a simple inputting operation. Since the work stations 41 are connected to the print server 42, the file server 43 and the facsimile server 44 via the transmission path 49, the work stations 41 can share these servers. Additionally, each of the work stations 41 may be provided with an image inputting apparatus, if necessary, so as to perform, document preparation and editing using an image or a text.

It should be noted that a personal computer having a communication interface may be used as a client which serves the same role as each of work stations 41. It is common for each person in an office to have his/her own personal computer with a communication interface.

In this situation, a user may desire to perform text preparation and editing with images input by using his/her own personal computer. In order to satisfy the user's request, an image inputting apparatus may be provided for the personal computer of each user. However, since the image inputting apparatus is very expensive, there is a problem in that the total cost for providing the image inputting apparatus for the personal computer of each user is extremely high, and thus this method in not economical.

Since each personal computer has a communication interface, it is more economical to have a plurality of users share a single image inputting apparatus which is located near the information inputting apparatus. This method is particularly advantageous because an image input is not needed very often from a single user, and because as a population of personal computers is increased, the usage of an image inputting apparatus increases, and the distance between the image inputting apparatus and each of the information processing apparatuses decreases.

SUMMARY OF THE INVENTION

It is therefore an object of the present invention to provide a networked information processing system in which the above-mentioned disadvantages are eliminated.

According to one aspect on the invention, there is an information processing system in which a plurality of information processing apparatuses inter-communicate with each other, where the information processing system includes:

a plurality of first information processing apparatuses, each having a defining means for defining information processes, an adding means for adding identifiers to the defined information processes, and registering means for registering the information processes and the identifiers in accordance with the information processes, and transferring means for transferring data of the registered information processes and the identifiers in the registering means to a plurality of second information processing apparatus, and a second information processing apparatus having data receiving means for receiving the data from the first information processing apparatus, memory means for memorizing said data received by said receiving means, select means for selecting at least one of the identifiers memorized in the memory means, and processing means for processing the defining information processes in the memory means in accordance with the selected identifiers.

According to another aspect of the invention, there is an information processing system in which a plurality of information processing apparatuses inter-communicate with each other, where the information processing system includes:

a plurality of first information processing apparatuses, each having a defining means for defining information processes, an adding means for adding identifiers to the defined information processes, registering means for registering the information processes and the identifiers in accordance with the information processes, select means for selecting at least one of the identifiers registered in the registering means, and transferring means for transferring data of the defining information processes, and the selected identifiers to a plurality of selected second information processing apparatus, and a second information processing apparatus having data receiving means for receiving the data from the first information processing apparatus, memory means for memorizing the data received by the receiving means, and processing means for processing the defining information processes in the memory means in accordance with the selected identifiers by the first information processing apparatus.

According to another aspect of the invention, there is an information processing system in which a plurality of information processing apparatuses inter-communicate with each other, where the information processing system includes:

a plurality of first information processing apparatuses, each having a defining means for defining information processes, an adding means for adding identifiers to the defined information processes, and registering means for registering the information processes and the identifiers in accordance with the information processes, and data writing means for writing data of the defining information processes and the identifiers to a separable memory, and a second information processing apparatus having data reading means for reading the data from the separable memory, memory means for memorizing the data read by the data reading means, select means for selecting at least one of the identifiers memorized in the memory means, and processing means for processing the defining information processes in the memory means in accordance with the selected identifiers.

According to another aspect of the invention, the second information processing apparatus further includes an image input means for inputting image data, and processing means for processing the defining information processes to the image data.

According to another aspect of the invention, the second information processing apparatus further includes a distributing means for distributing the processed image data to directed information processing apparatuses.

According to another aspect of the invention, each of the first information processing apparatus is a personal computer having a communication interface.

According to another aspect of the invention, the second information processing apparatus is a digital copy machine having a communication interface.

According to another aspect of the invention, the second information processing apparatus is a facsimile machine.

BRIEF DESCRIPTION OF THE DRAWINGS

A more complete application of the invention and many of the attendant advantages thereof will be readily obtained as the same becomes better understood by reference to the following detailed description when considered in connection with the accompanying drawings, wherein:

FIG. 4 illustrates a screen sample image on a display of the first information processing apparatus.

DESCRIPTION OF THE PREFERRED EMBODIMENTS (The first embodiment)

Figure 2:
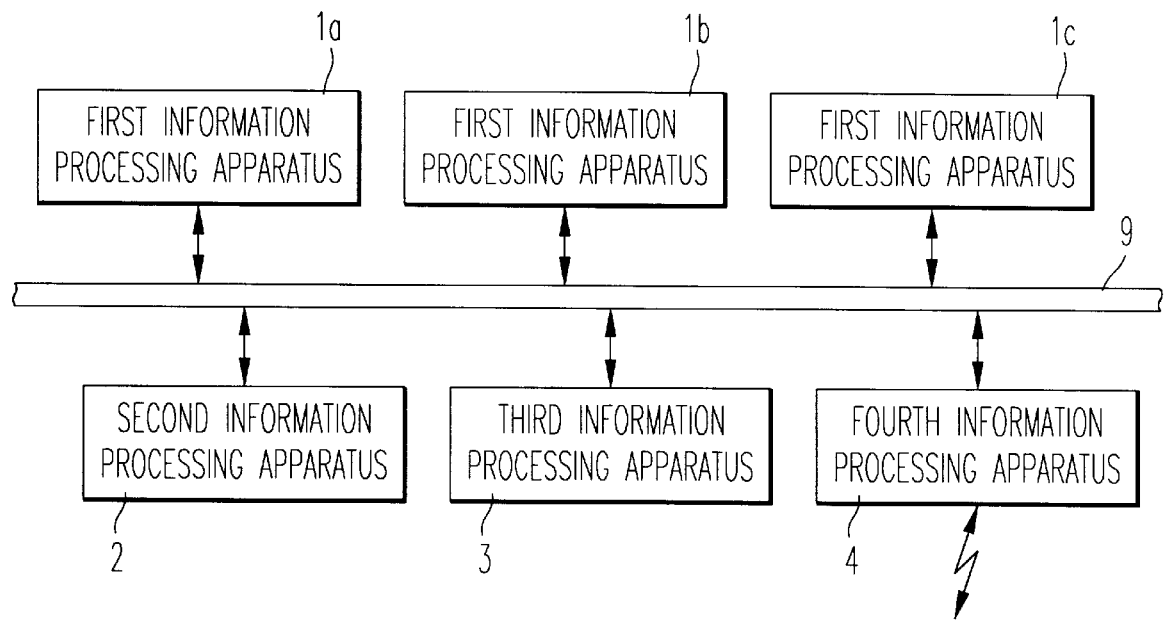
FIG. 2 is an illustration showing an essential part of a system structure of a network system according to the present invention.

Referring now to the drawings, wherein like reference numerals designate identical or corresponding parts throughout the several views, and more particularly to FIG. 2 thereof, there is illustrated an essential part of a system structure of the network system according to the present invention. In FIG. 2, three of the first information processing apparatuses 1a, 1b and 1c are shown, but the number of first information processing apparatuses is not limited to three. The network system further includes a second information processing apparatus 2 which has an image inputting apparatus which is shared with the first information processing apparatuses. In FIG. 2, a single second image processing apparatuses is provided. A third information processing apparatus 3 functions as print server. And a fourth information processing apparatus 4 functions as a facsimile server. The above-mentioned first, second, third, and fourth information processing apparatuses are connected to each other by a transmission path 9.

In the above-mentioned construction, each of the first information processing apparatuses 1a, 1b and 1c (hereinafter referred to as simple "first information processing apparatus 1") may be a personal computer having a communication interface or a work station which is referred to as a client. A client using the network system as an information processing system uses the first information processing apparatus to perform most jobs. Accordingly, the first information processing apparatus 1 is generally provided with a sophisticated user interface. The user executes various application programs by using the first information processing apparatus 1.

Each of the second third and fourth information processing apparatuses 2, 3, and 4 is referred to as a server, and functions thereof are shared with the first information processing apparatus 1 to execute a specific application program.

Figure 3:
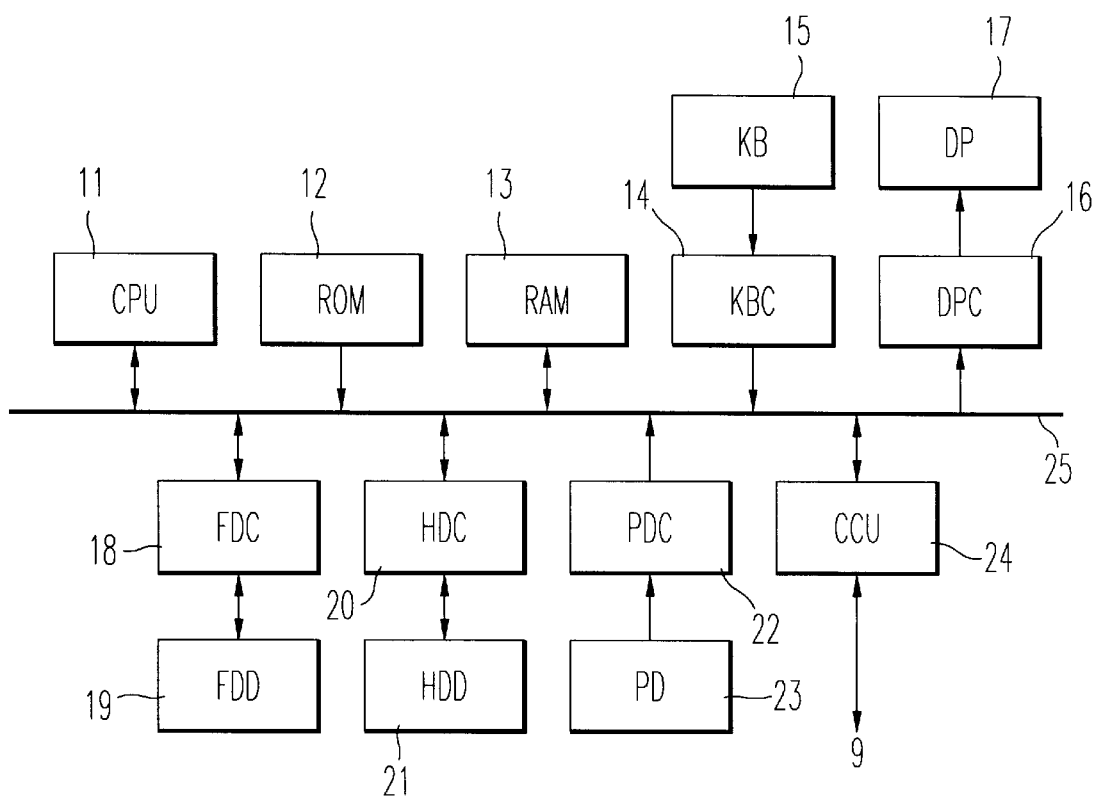
FIG. 3 is a block diagram of a first information processing apparat shown in FIG. 2.

A description will now be given, with reference to FIG. 2, of a structure of the first information processing apparatus 1. FIG. 3 is a block diagram of the first information processing apparatus 1 shown in FIG. 2.

In FIG. 3, a central processing unit (CPU) 11 controls structural elements not shown in the figure in accordance with an operating system stored in a read-only memory (ROM) 12, and executes an application program loaded to a random-access memory (RAM) 13. The application program is loaded to the RAM 13 from, for example, a floppy disk attached to a floppy disk drive (FDD) 19 via a floppy disk drive controller (FDC) 18.

A keyboard (KB) 15 is used for inputting character information of a text and instructions to the first information processing apparatus 1. Input information which is converted into code information is transferred to the RAM 13 via a keyboard controller (KBC) 14, and is stored in the RAM 13. A display (DP) 17 is controlled by a display controller (DPC) 16, and includes s display, such as a CRT or an LCD, for displaying messages to a user. Various sets of file data are stored in a hard disk incorporated into a hard disk drive (HDD) 21 via a hard disk controller (HDC) 20. A pointing device controller (PDC) 22 controls a pointing device (PD) 23, for example a mouse, or tracking ball, etc., for pointing on a screen of the display 17. The CPU 11 gets X-Y position data positioned by a operator from the pointing device via the pointing device controller 22, and controls a cursor on the screen of the display 17 by way of the display controller. A communication controller (CCU) 24 controls communications with other information processing apparatus 1 which are connected to each other via a bus line 25.

The keyboard, keyboard controller, display, display controller, pointing device and pointing device controller operate together to define information processes. The control processing unit, read-only memory and random-access memory operate together to add identifiers to the defined information processes. The hard disk drive and hard disk controller register the information processes. The floppy disk drive, floppy disk controller and communication controller operate to transfer registered data to a second information processing apparatus.

FIG. 4 illustrates a sample image on the display 17. In the figure, numbers "1", "2", "3", "4", and "5" are identifiers to definite parameters.

The identifier "1" defines the input image data, and transfers the input image data to the first information processing apparatus 1 . The second parameter selects the scanning mode, whether binary (black/white) or multi-level.

A "TANAKA", as the first mode of the third parameter "TRANSFER", means a destination of the first information processing apparatus 1 to which the input image data is transferred. The "TANAKA" is a name of the first or second information processing apparatus 1 or 2.

A "16", as the second mode of the third parameter "TRANSFER", means the level of resolution when the image data are transferred. The ordinary level of reading resolution is 32 dots/mm, however, the level of transferring resolution is reduced to 16 dots/mm in order to increase the efficiency of transferring the image data.

A "16", as the third mode of the third parameter "TRANSFER", means the level of half-tone. The ordinary level of half-tone when reading is 256 tones, however when transferring, the tone is reduced to 16 tones for the same reason as the level of resolution.

The identifier "2" defines the input image data, and causes the input image data to be sent to another remote facsimile because the second parameter "FAX" of the identifier "2" orders the fourth information processing apparatus to facsimile.

A "SATO", as the first mode of the third parameter "FAX", means a destination of the facsimile to which the input image data is transferred. The "SATO" is a name of the facsimile. An "8", as the second mode of the third parameter "FAX" means the level of resolution when the image data are facsimiled. A "FRONT PAGE", as the third mode of the third parameter "FAX", means adding a front page for the facsimile to the image data. An "18:30", as the second mode of the third parameter "FAX" means the time when the facsimile is sent.

The identifier "3" defines the input image data, and prints the input image data on paper because the second parameter "PRINT" of the identifier "3" orders the third information processing apparatus 3 to print.

A "6", as the first mode of the third parameter "PRINT", means the number of copies. So the third information processing apparatus 3 prints 6 copies of the image data. A "32", as the second mode of the third parameter "PRINT" means the level of printing resolution. A "64", as the third mode of the third parameter "PRINT" means the half tone level. "PAGE", as the fourth mode of the third parameter "PRINT" means paging the copies.

A "DISTRIBUTION", as the second parameter of the identifier "4" means inputting the image data, and distributing the input image data to the information processing apparatus of the "TANAKA", a "NAKAMURA", the "SATO", and a "SASAKI". The "TANAKA", the "NAKAMURA", the "SATO", and the "SASAKI" are names of the information processing apparatuses.

Figure 5:
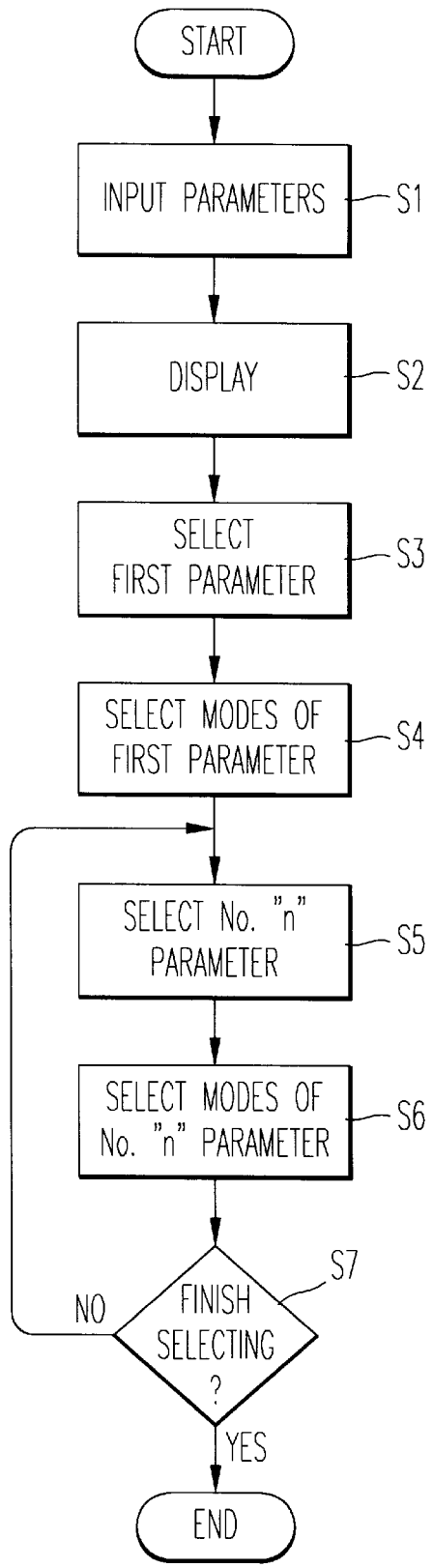
FIG. 5 is a flowchart of an operation performed by the first information processing apparatus shown in FIG. 2 when information processes are defined and identifiers are added by the first information processing apparatus.

FIG. 5 illustrates a flowchart of an operation performed by the first information processing apparatus 1 shown in FIG. 2. In FIG. 5, the parameters are input, in S1, using the pointing device 23. The CPU 11 loads the RAM 13 or the ROM 12 to perform a program for displaying a sample image on the display 17 such as shown in FIG. 4, in S2.

The operator selects the parameters of the first identifier "1", in S3. For example, the operator selects the parameter of "IMAGE INPUT". After selecting parameters, the operator selects the mode of each parameter, in S4.

The operator selects the parameters of a identifier "n", in S5. After selecting the parameters, the operator selects the mode of each parameter, in S6. The CPU 11 determines, in S7, whether or not the parameters of all identifiers are selected.

If it is determined, in S7, that the parameters of all identifiers are not selected, the routine proceeds to S5. If it is determined, in S7, that parameters of all identifier are selected, the routine proceeds to end.

Figure 1:
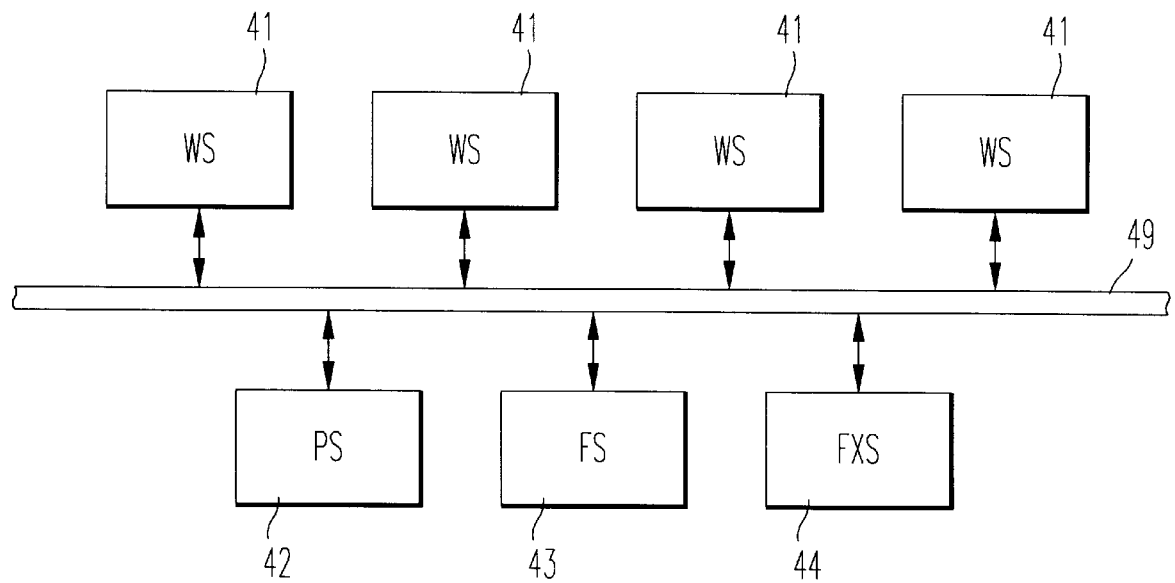
FIG. 1 is an illustration showing an example of a conventional information processing system.
Figure 6:
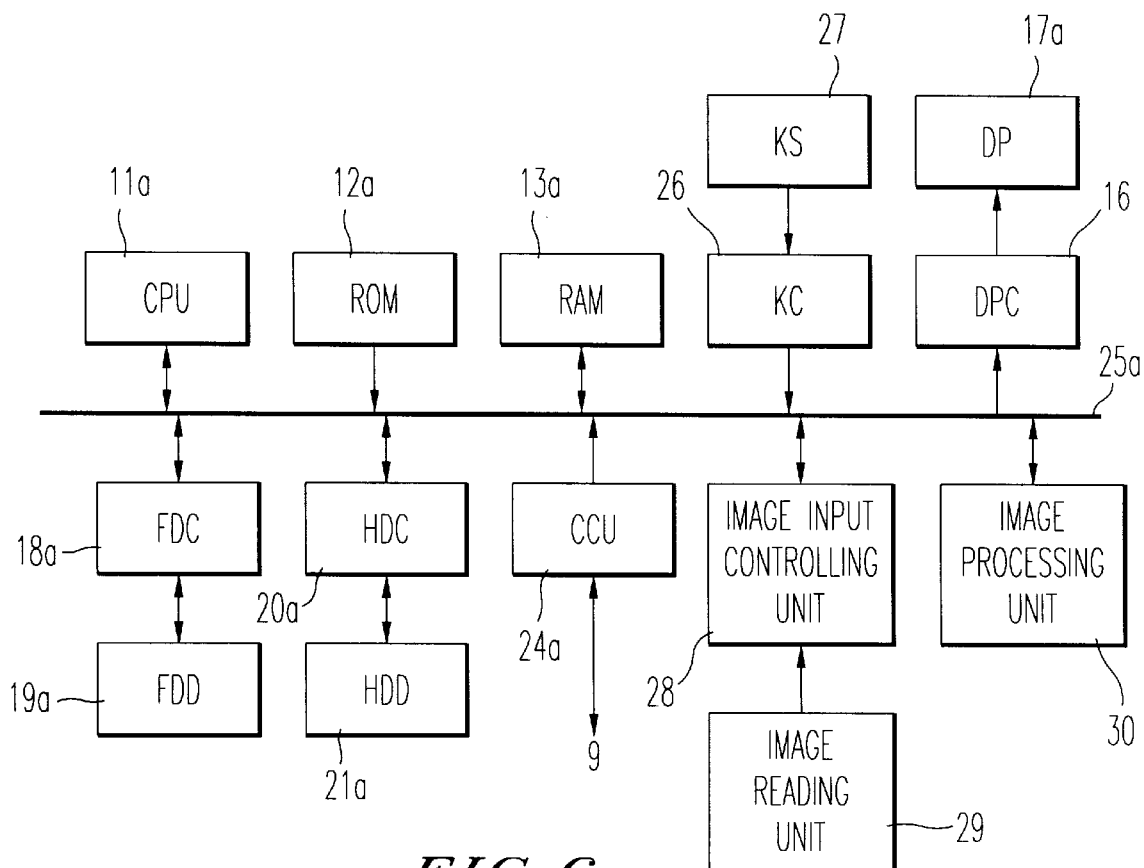
FIG. 6 is a block diagram of a second information processing apparatus shown in FIG. 2.

A description will now be given, with reference to FIG. 6, of the structure of the second information processing apparatus 2 shown in FIG. 2. In FIG. 6, parts that serve basically the same function as the parts shown in FIG. 3 are given the same reference numerals but with a suffix "a", and descriptions thereof will be omitted. For example, a CPU 11a shown in FIG. 6 serves the same function as the CPU 11 shown in FIG. 3.

It should be noted that programs stored in a ROM 12a may include a different program from that stored in ROM 12. Additionally it should be noted that programs stored in RAM 13a and on the hard disk in HDD 21a is basically different from that in the RAM 13 and the hard disk in the HDD 21. A display apparatus 17a may use a simple display device as compared with the display apparatus 17.

A set of keys 27 (Ks), includes a ten-key keypad and some other keys, instead of the keyboard 15 of the first information processing apparatus 1. Instruction information input from the set of keys 27 is transferred inside the second information processing apparatus 2 via a key controller (Kc) 26.

The second information processing apparatus 2 is provided with an image reading unit 29, an image input controlling unit 28 and an image processing unit 30. The image reading unit 29 scans an original image to input image data to a RAM 13a or to the image processing unit 30 via the image input controlling unit 28 by which image data is converted into digital data.

Figure 7:
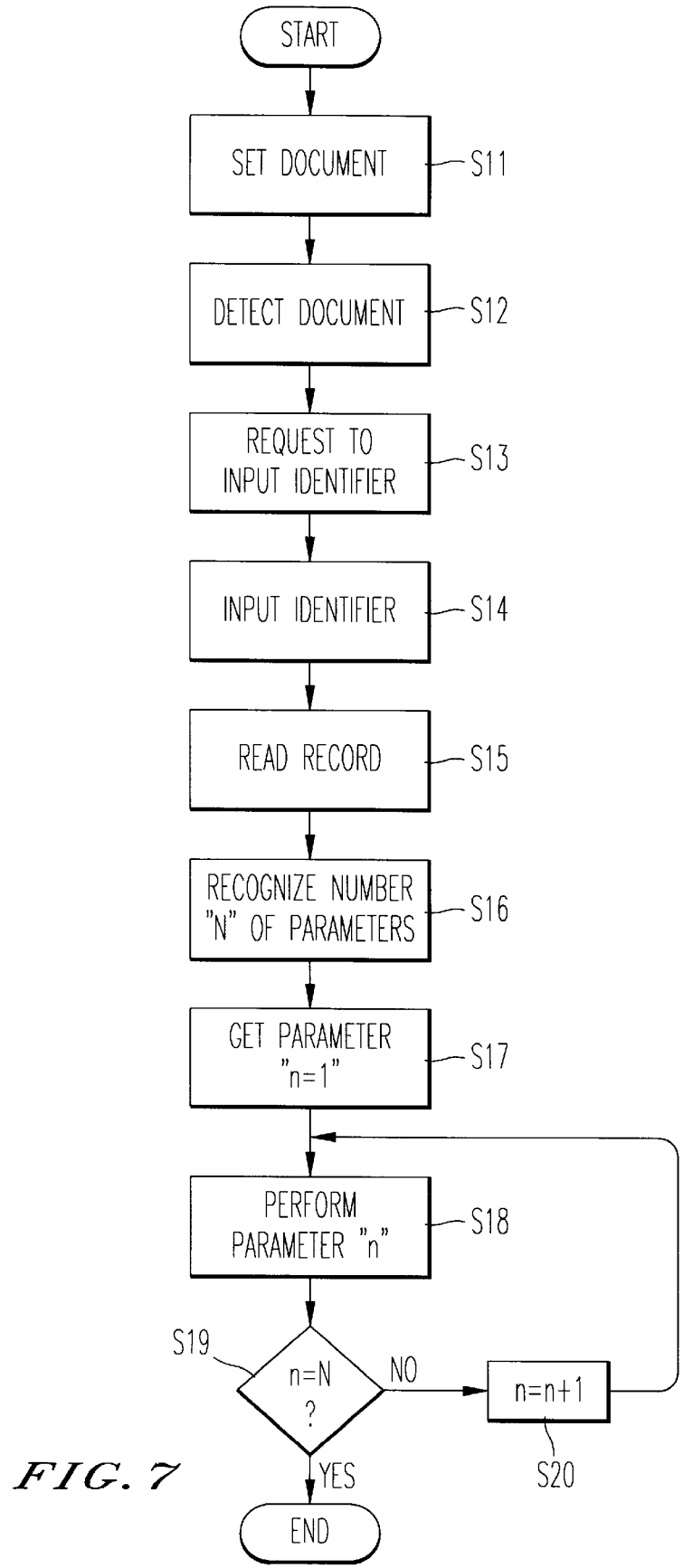
FIG. 7 is a flowchart of operation performed by the second information processing apparatus shown in FIG. 2 when image data are processed in accordance with selected information processes by the second information processing apparatus of the first embodiment.

FIG. 7 illustrates a flowchart of an operation of transferring image data to the first information processing apparatus 1 of the first embodiment .

In the first embodiment, image data are input by the first information processing apparatus 1 shown in FIG. 2, and the first information processing apparatus 1 transfers the image data to the second information processing apparatus 2 shown in FIG. 2.

An operator sets, in S11, documents on the image reading unit 29. The image reading unit 29 has a detector for detecting whether a document is set. When the detector in the image reading unit 29 detects that the documents are set on the image reading unit 29, the data of the document on the image reading unit 29 is transferred to the CPU 11a via the image input controlling unit 28. Having received the data, in S12, the CPU 11a performs a program stored in the ROM 12a,and displays, in 13 a message as "INPUT IDENTIFIER" on the display 17a in accordance with the program via a display controller 16a in order to request the operator to input identifiers.

The operator inputs, in S14, figure "1" as a identifier through the ten-keypad of the set of keys 27. The CPU 11a reads, in S15, a record in accordance with the identifier "1" in the hard disk incorporated into the hard disk drive 21a via the hard disk controller 20aThe CPU 11a checks the record, and recognizes, in S16, the number "N" of parameters.

The CPU 11a gets, in S17, the first parameter (n=1), and performs, in S18, the program in ROM 12a in accordance with the No. "n (the first) " parameter. The CPU 11 determines, in S19, whether or not the parameter is the last parameter (n=N).

If it is determined, in S19, that the parameter is not the last parameter (n<N), "n" is counted up "+1" (n=n+1), in S20, and the routine proceeds to S18.

If it is determined, in S4, that the parameter is the last parameter (n=N), the routine proceeds to end.

(The second embodiment)

Figure 8:
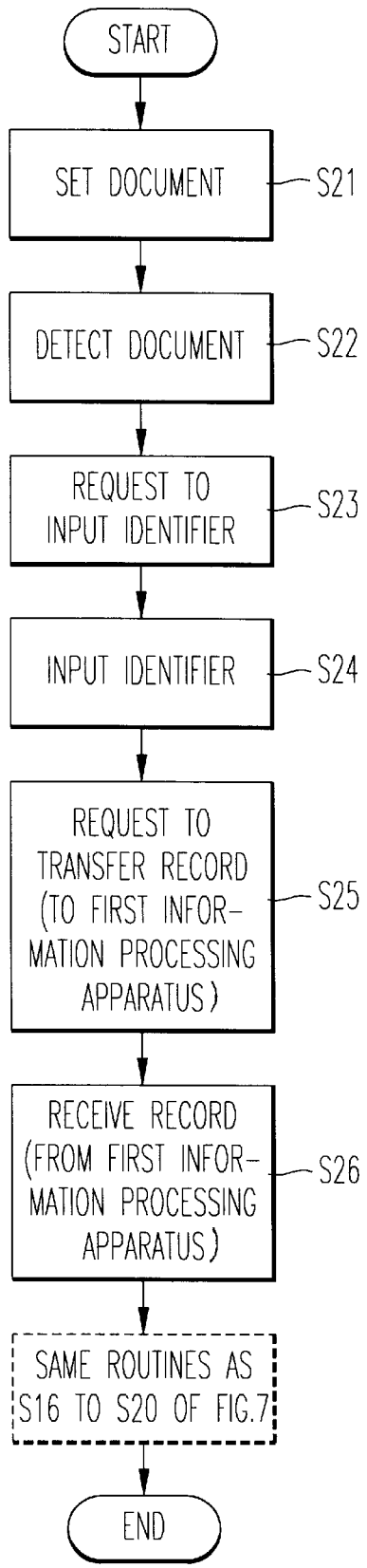
FIG. 8 is a flowchart of operation performed by the second information processing apparatus shown in FIG. 2 when image data are processed in accordance with selected information processes by the second information processing apparatus of the second embodiment.

FIG. 8 illustrates a flowchart for an operation of processing image data in the second information processing apparatus 2 of the second embodiment.

A operator sets, in S21, documents on the image reading unit 29. The image reading unit 29 has a sensor to detect whether a document is set. When the sensor in the image reading unit 29 senses that the documents are set on the image reading unit 29, the data of the document on the image reading unit 29 is transferred to the CPU 11a via the image input controlling unit 28. Having received the data, in S22, the CPU 11a performs a program stored in the ROM 12a,and displays, in 23 a message as "INPUT IDENTIFIER" on the display 17a in accordance with the program via a display controller 16a.

The operator inputs, in S24, figure "1" through the ten-keypad of the set of keys 27. The CPU 11a requests, in S25, the transfer of a record in accordance with the identifier "1" to the first information processing apparatus 1. The first information processing apparatus 1 transfers the record requested by the CPU 11a to the second information apparatus 2. The CCU 24a receives the record, in S26. The steps which follow are same steps as S16 to S20 of FIG. 7.

(The third embodiment)

The second information processing apparatus 2 loads the data of defined information processes and the identifiers using the floppy disk instead of the hard disk. The floppy disk has written therein the data of the defined information processes and the identifiers by the floppy disk drive 19 of the first information processing apparatus 1. The disk is inserted in the floppy disk drive 19a of the second information processing apparatus 2 by the operator. After inserting the floppy disk in the floppy disk drive 19a,the operator selects the identifiers displayed on the display 17a using the set of keys 27.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters: Patent of the United States is:

1. An information processing system in which a plurality of information processing apparatuses perform intercommunication with each other, said information processing system comprising:

a plurality of first information processing apparatus, each having a defining means including an input means and a display so that an operator can input data for defining information processes, said display including the icons "TRANSFER", "FAX", "PRINT", "PAGE", "DISTRIBUTION", an adding means for adding identifiers to said defined information processes, registering means for registering said information processes and said identifiers in accordance with said information processes, and transferring means for transferring data of said registered information processes and said identifiers in said registering means; and second information processing apparatus connected to each of said plurality of first information processing apparatus having data receiving means for receiving said data from said first information processing apparatus, memory means for memorizing said data received by said receiving means, select means for selecting at least one of said identifiers memorized in said memory means, and processing means for processing said defining information processes in said memory means in accordance with said selected identifiers.

2. An information processing system in which a plurality of information processing apparatuses perform intercommunication with each other, said information processing system comprising:

a plurality of first information processing apparatus, each having a defining means including an input means and a display so that an operator can input data for defining information processes, said display including the icons "TRANSFER", "FAX", "PRINT", "PAGE", "DISTRIBUTION", an adding means for adding identifiers to said defined information processes, registering means for registering said information processes and said identifiers in accordance with said information processes, select means for selecting at least one of said identifiers registered in said registering means, and transferring means for transferring data of said defining information processes and said select identifiers; and second information processing apparatus connected to each of said plurality of first information processing apparatus having data receiving means for receiving said data from said first information processing apparatus, memory means for memorizing said data received by said receiving means, and processing means for processing said defining information processes in said memory means in accordance with said selected identifiers.

3. An information processing system in which a plurality of information processing apparatuses perform intercommunication with each other, said information processing system comprising:

a plurality of first information processing apparatus, each having a defining means including an input means and a display so that an operator can input data for defining information processes, said display including the icons "TRANSFER", "FAX", "PRINT", "PAGE", "DISTRIBUTION", an adding means for adding identifiers to said defined information processes, registering means for registering said information processes and said identifiers in accordance with said information processes, and data writing means for writing data of said defining information processes and said identifiers to a separable memory; and second information processing apparatus connected to each of said plurality of first information processing apparatus having data receiving means for receiving said data from said separable memory, memory means for memorizing said data read by said data reading means, select means for selecting at least one of said identifiers memorized in said memory means, and processing means for processing said defining information processes in said memory means in accordance with said selected identifiers.

4. The information processing system as claimed in claim 1, 2, or 3 wherein said second information processing apparatus further comprises image input means for inputting image data, and wherein said processing means processes said image data.

5. The information processing system as claimed in claim 4, wherein said second information processing apparatus further comprises distributing means for distributing said processed image data to directed information processing apparatuses.

6. The information processing system as claimed in claim 1, 2, or 3 wherein each of said first information processing apparatus is a personal computer having a communication interface.

7. The information processing system as claimed in claim 1, 2, or 3 wherein said second information processing apparatus is a digital copy machine having a communication interface.

8. The information processing system as claimed in claim 1, 2, or 3 wherein said second information processing apparatus is a facsimile machine.

* * * * *